US008867349B2

(12) United States Patent
Martini et al.

(10) Patent No.: US 8,867,349 B2
(45) Date of Patent: Oct. 21, 2014

(54) REGULATION OF NETWORK TRAFFIC IN VIRTUAL PRIVATE NETWORKS

(75) Inventors: Luca Martini, Lakewood, CO (US); James Neil Guichard, New Boston, NH (US)

(73) Assignee: Cisco Technology, Inc., San Jose, CA (US)

(*) Notice: Subject to any disclaimer, the term of this patent is extended or adjusted under 35 U.S.C. 154(b) by 397 days.

(21) Appl. No.: 12/467,918

(22) Filed: May 18, 2009

(65) Prior Publication Data
US 2010/0290485 A1 Nov. 18, 2010

(51) Int. Cl.
| H04L 12/26 | (2006.01) |
| H04L 12/815 | (2013.01) |
| H04L 12/715 | (2013.01) |
| H04L 12/801 | (2013.01) |
| H04L 12/813 | (2013.01) |
| H04L 12/46 | (2006.01) |
| H04L 12/723 | (2013.01) |

(52) U.S. Cl.
CPC .............. *H04L 45/50* (2013.01); *H04L 47/22* (2013.01); *H04L 45/04* (2013.01); *H04L 47/10* (2013.01); *H04L 47/20* (2013.01); *H04L 12/4641* (2013.01)
USPC ........ 370/230.1; 370/389; 370/392; 370/230; 709/223; 709/228; 709/229; 709/238

(58) Field of Classification Search
CPC ............ H04L 63/0272; H04L 12/4633; H04L 12/4641; H04L 12/4645; H04L 12/467; H04L 12/4675; H04L 47/825; H04L 47/10; H04L 45/04; H04L 47/22; H04L 47/20; H04L 45/50
USPC ........ 370/477, 392, 393, 389, 397, 400, 401, 370/230, 230.1; 709/224–226, 223, 228, 709/229, 238
See application file for complete search history.

(56) References Cited

U.S. PATENT DOCUMENTS

| 7,095,740 | B1 * | 8/2006 | Jagannath et al. ............ 370/392 |
| 2002/0194368 | A1 * | 12/2002 | Kon et al. .................... 709/238 |
| 2003/0041266 | A1 * | 2/2003 | Ke et al. ....................... 713/201 |
| 2004/0167677 | A1 * | 8/2004 | Weiss ............................ 700/291 |
| 2006/0224764 | A1 * | 10/2006 | Shinohara et al. ............ 709/232 |
| 2007/0058638 | A1 * | 3/2007 | Guichard et al. ........ 370/395.31 |
| 2007/0076755 | A1 * | 4/2007 | Sato et al. .................... 370/468 |
| 2007/0115985 | A1 * | 5/2007 | Choudhury et al. .......... 370/392 |
| 2007/0237159 | A1 * | 10/2007 | Yamada et al. ......... 370/395.53 |
| 2007/0268826 | A1 * | 11/2007 | Balakrishnan et al. ....... 370/230 |
| 2009/0006626 | A1 * | 1/2009 | Yamagishi ................... 709/226 |

* cited by examiner

*Primary Examiner* — Mark Rinehart
*Assistant Examiner* — Mang Yeung

(57) ABSTRACT

In an embodiment, a method is provided for regulating network traffic and virtual private networks. In this method, network traffic transmitted along multiple communication paths is received, and these communication paths are associated with forwarding identifiers. A portion of the forwarding identifiers is identified to match a particular forwarding identifier associated with a particular virtual private network. At the same time, the policy associated with the particular virtual private network is identified. A portion of the network traffic that is associated with the portion of the identified forwarding identifiers can then be regulated based on the policy.

23 Claims, 7 Drawing Sheets

REGULATION OF NETWORK TRAFFIC IN VIRTUAL PRIVATE NETWORKS

FIELD

The present disclosure relates generally to computer networks. In an example embodiment, the disclosure relates to the regulation of network traffic in virtual private networks

BACKGROUND

Currently, there is a shortage of long-distance network capacity, and this shortage has kept the cost of virtual private network traffic over long distances disproportionately higher than the cost of metro or in-region traffic. As a result, many service providers limit the bandwidth of inter-region traffic, but not the bandwidth of in-region traffic. To limit the bandwidth, network traffic leaving a region needs to be routed to a dedicated switch, which is specifically configured to limit the network traffic. However, the use of a dedicated switch can be inconvenient because it has to be provisioned at a customer's site and the extra hardware can be expensive.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided for regulating network traffic and virtual private networks. In this method, network traffic transmitted along multiple communication paths is received, and these communication paths are associated with forwarding identifiers. A portion of the forwarding identifiers is identified to match a particular forwarding identifier associated with a particular virtual private network. At the same time, the policy associated with the particular virtual private network is identified. A portion of the network traffic that is associated with the portion of the identified forwarding identifiers can then be regulated based on the policy.

Example Embodiments

Figure 1:
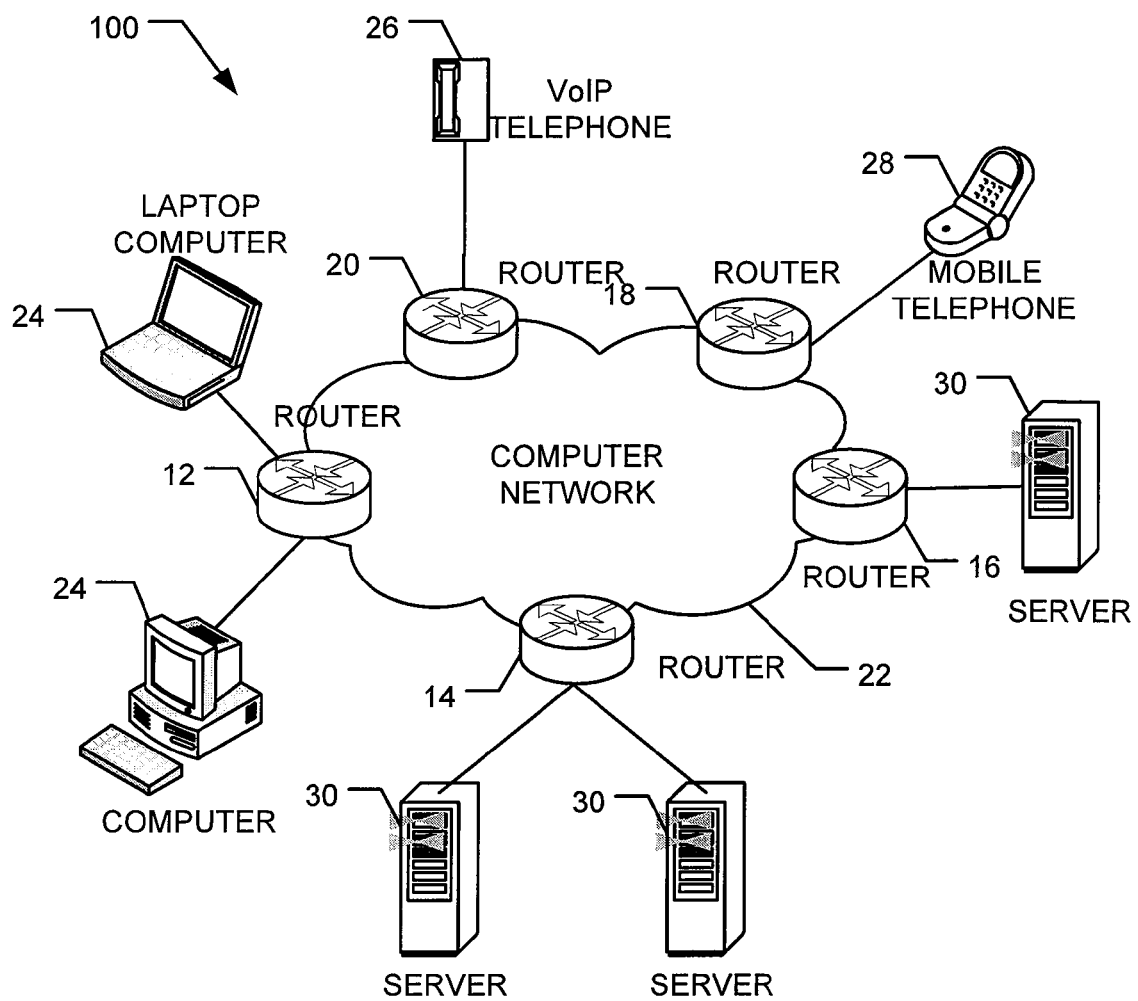
FIG. 1 depicts a diagram of a network system, in accordance with an illustrative embodiment.

FIG. 1 depicts a diagram of a network system 100, in accordance with an illustrative embodiment. The network system 100 includes various network nodes, which may be embodied in devices or apparatuses 12, 14, 16, 18, 20, 24, 26, 28, and 30, and data is communicated between the various network nodes. In particular, the network nodes may include routers 12, 14, 16, 18, and 20 that are shown to be connected by way of a computer network 22, which may include one or more local area networks and/or wide area networks, such as the Internet. A local area network connects nodes over dedicated private communications links located in the same general physical location, such as a building or a campus. A wide area network, on the other hand, connects geographically dispersed nodes over long-distance communications links, such as common carrier telephone lines, opticallightpaths, synchronous optical networks (SONET), or synchronous digital hierarchy (SDH) links. The Internet is an example of a wide area network that connects disparate networks throughout the world, providing global communication between nodes on various networks. The network system 100 also includes other devices such as, for example, computers 24, Voice-over-Internet Protocol (VoIP) telephone 26, mobile telephone 28, and servers 30.

In the network system 100, data is communicated by way of Internet Protocol (IP) packets or datagrams using a variety of suitable upper-layer transport communication protocols. For example, packets may be encapsulated and communicated using Transmission Control Protocol (TCP)/Hypertext Transport Protocol (HTTP), User Datagram Protocol (UDP) protocol, and/or Stream Control Transmission Protocol (SCTP). Although the network system 100 is shown to include routers 12, 14, 16, 18, and 20, it should be noted that the embodiments described herein are equally applicable to other devices that receive digital data for processing and communication to other devices.

Figure 2:
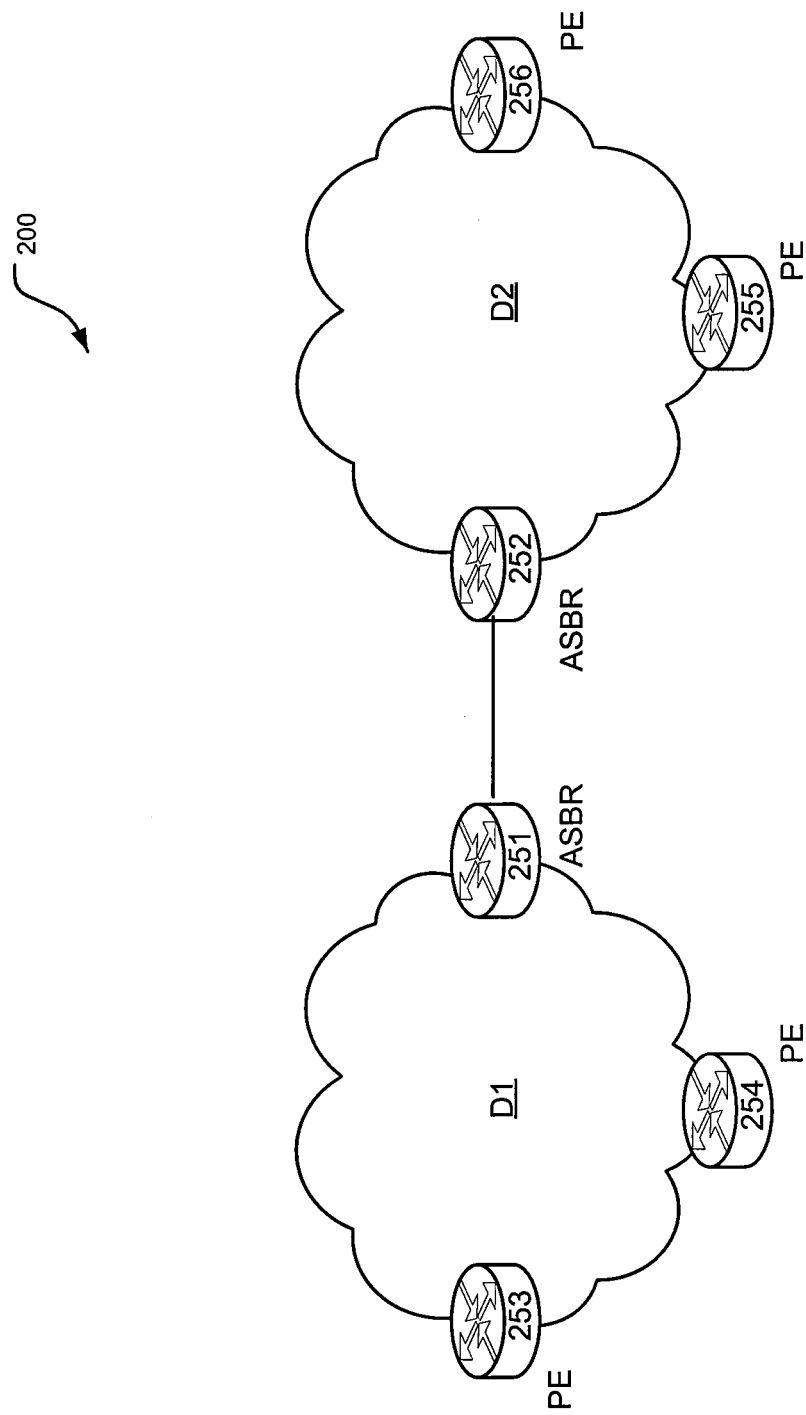
FIG. 2 depicts a diagram of an example of a computer network, in accordance with an embodiment.

FIG. 2 depicts a diagram of an example of a computer network 200, in accordance with an embodiment. As shown in FIG. 2, the computer network 200 includes multiple domains D1 and D2 interconnected by inter-domain routers 251-256. It should be appreciated that groups of computer networks may be maintained as domains D1 and D2. A "domain," such as domain D1 or D2, is a collection of network nodes under the control of one or more entities that present a common routing policy. Each domain D1 or D2 may also be referred to as an autonomous system, a routing domain, or community.

The distinct networks within domains D1 and D2 can be coupled together by inter-domain routers 251-256 subject to different common authorities. In particular, the inter-domain routers 251-256 of FIG. 2 include autonomous system border routers (ASBR) 251-252 and provider edge (PE) routers 253-256. An autonomous system boundary router 251 or 252 is a router that connects different domains D1 and D2 and may, for example, be located between domains D1 and D2. A provider edge (PE) router 253, 254, 255, or 256 is placed at the edge of an Internet service provider (ISP) network, and may communicate by way of a routing protocol to other provider edge routers 253, 254, 255, and/or 256 or domain D1 or D2. A customer edge (CE) router (not shown) is another example of an inter-domain router that is located at the edge of a network associated with a customer or subscriber, and the customer edge router may communicate by way of a routing protocol to other routers internal or external to its domain D1 or D2.

The inter-domain routers 251-256 communicate by way of routing protocols. In general, a routing protocol is a protocol that specifies how routers or other devices communicate with each other to disseminate logical identifiers, and thereby allows the routers or other devices to select routes for flows of network packets. An example of a routing protocol is Border Gateway Protocol (BGP), which is an inter-domain routing protocol used within the Internet to exchange IP address prefix and network layer reachability information (NRLI) between domains D1 and D2 to distribute external IP address prefix information within a domain D1 or D2. Other examples of inter-domain protocols include Interior Border Gateway Protocol (a type of BGP), Exterior Border Gateway Protocol (a type of BGP), Interior Gateway Protocol, and other inter-domain protocols.

It should be noted that a number of nodes and links may be used in the computer network 200, and that the computer network 200 shown herein is for simplicity. Further, the computer network 200 is described in relation to multiple domains D1 and D2, and the computer network 200 may apply to a variety of other inter-domain network configurations, such as IP virtual private networks, inter-autonomous system virtual private networks, and other network configurations. In general, a "virtual private network," refers to a service provided whereby, for example, a customer network may be carried transparently across a public network. As explained in more detail below, examples of virtual private networks include a layer 2 virtual private network and a layer 3 virtual private network.

Additionally, the computer network 200 may also apply to a variety of other network configurations, such as intra-domain, intra-area, intra-level, and other network configurations. For example, to improve routing scalability, a service provider (e.g., an Internet service provider) may further divide a domain D1 or D2 into multiple areas (not shown) and area border routing devices (not shown) may be used to interconnect nodes of the areas.

Figure 3:
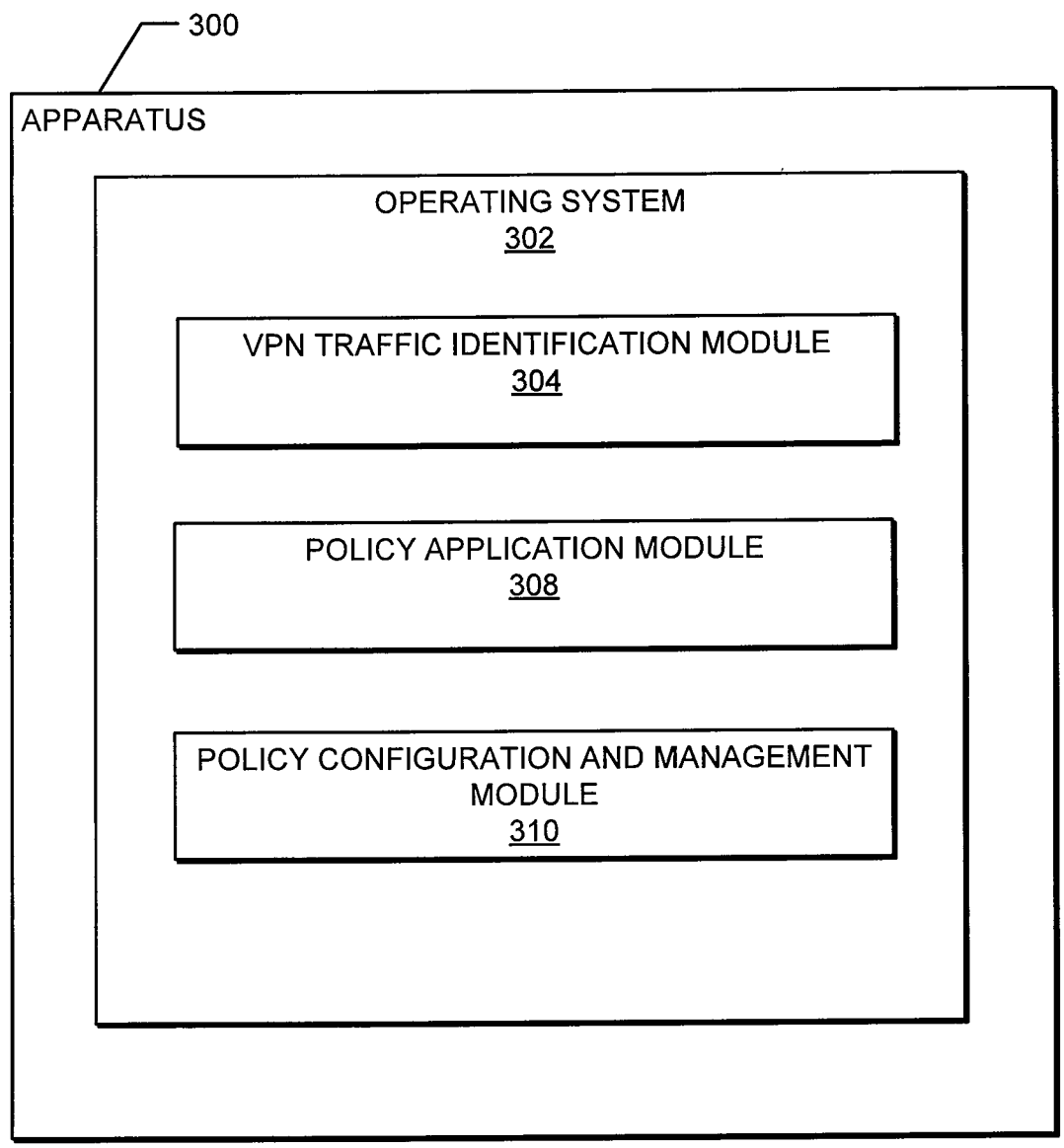
FIG. 3 depicts a block diagram of various modules, consistent with one embodiment of the invention, included in an apparatus that is configured to regulate network traffic in virtual private networks.

FIG. 3 depicts a block diagram of various modules 304, 308, and 310, consistent with one embodiment of the invention, included in an apparatus 300 that is configured to regulate network traffic in virtual private networks. It should be appreciated that the apparatus 300 may be deployed in the form of a variety of routing devices that interface with another domain, area, or service provider, such as autonomous system border routers and area border routers, which are previously discussed above. In various embodiments, the apparatus 300 may be used to implement computer programs, logic, applications, methods, processes, or other software to regulate network traffic in virtual private networks, which is described in more detail below.

As depicted in FIG. 3, the apparatus 300 may include an operating system 302 (e.g., an Internetworking Operating System) that manages the software processes and/or services executing on the apparatus 300. As depicted in FIG. 3, these software processes and/or services may include a virtual private network traffic (VPN) identification module 304, a policy application module 308, and a policy configuration and management module 310.

The virtual private network traffic identification module 304 is configured to receive network traffic along multiple communication paths and, as explained in more detail below, identify one or more portions of the network traffic or communication paths to be associated with a particular virtual private network. Once the portions are identified, as described in more detail below, the policy application module 308 is configured to regulate the portions of the network traffic based on a policy assigned to or customized for that particular virtual private network. The policy configuration and management module 210 supports a centralized management of policies, such as creating, tuning, and optimizing policies. A "policy," as used herein, refers to a set of statements or rules that define an allocation of a network's resources. A quality of service (QoS) policy is an example of a policy that refers to a set of statements defining characteristics (e.g., throughput, priority, and error rates) of a computer network.

It should be appreciated that in other embodiments, the apparatus 300 may include fewer or more modules apart from those shown in FIG. 3. For example, the policy application module 308 may be combined with the policy configuration and management module 310 into an integrated module that is configured to apply and manage the policies. The modules 304, 308, and 310 may be in the form of software that is processed by a processor. In another example, the modules 304, 308, and 310 may be in the form of firmware that is processed by Application Specific Integrated Circuits (ASICs), which may be integrated into a circuit board. Alternatively, the modules 304, 308, and 310 may be in the form of one or more logic blocks included in a programmable logic device (e.g., a field-programmable gate array). The described modules 304, 308, and 310 may be adapted, and/or additional structures may be provided, to provide alternative or additional functionalities beyond those specifically discussed in reference to FIG. 3. Examples of such alternative or additional functionalities will be discussed in reference to the flow diagrams discussed below. The modifications or additions to the structures described in relation to FIG. 3 to implement these alternative or additional functionalities will be implementable by those skilled in the art, having the benefit of the present specification and teachings.

Figure 4:
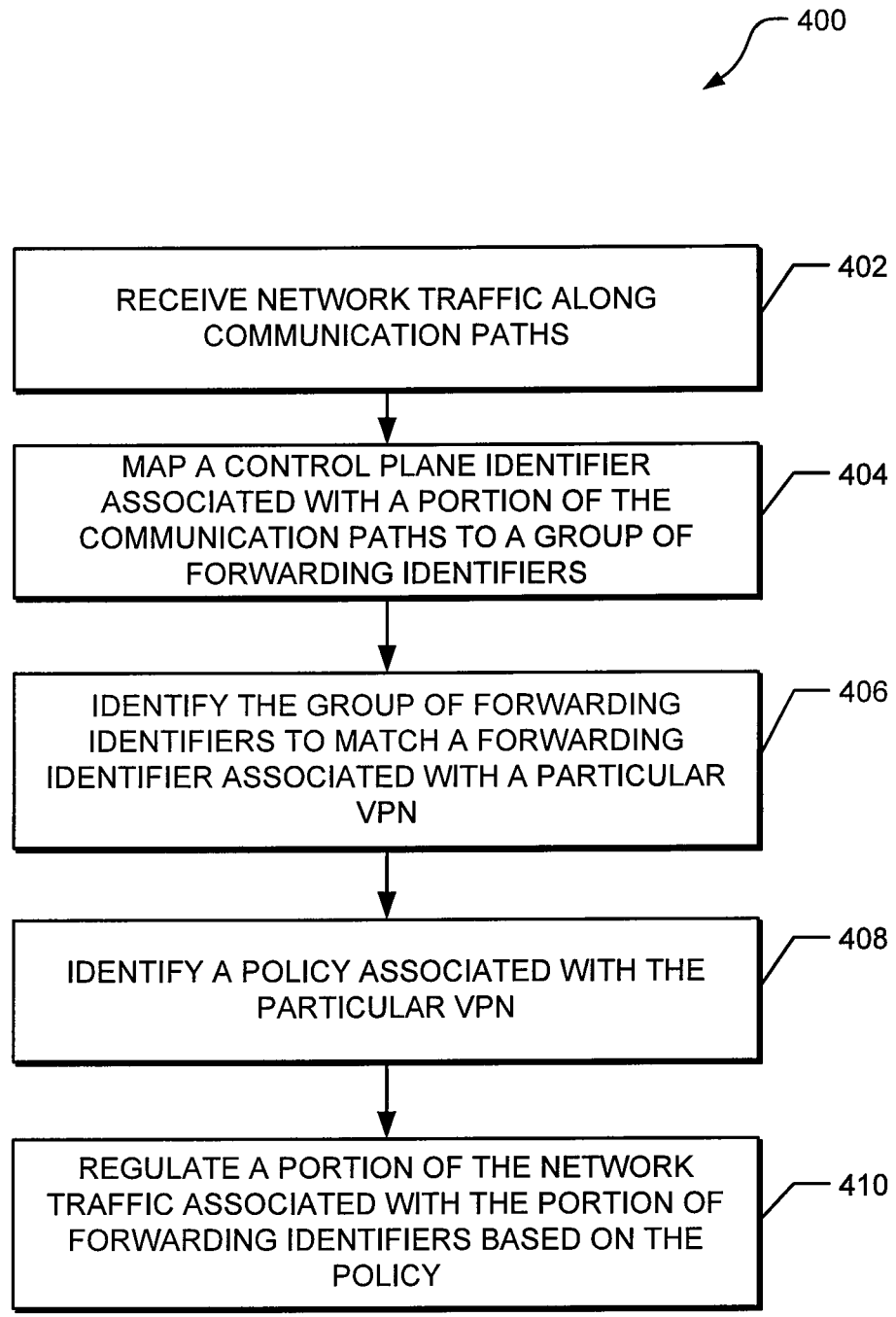
FIG. 4 depicts a flow diagram of a general overview of a method, in accordance with an embodiment, for regulating network traffic in virtual private networks.

FIG. 4 depicts a flow diagram of a general overview of a method 400, in accordance with an embodiment, for regulating network traffic in virtual private networks. In an embodiment, the method 400 may be implemented by the virtual private network traffic identification module 304 and the policy application module 308, and employed in the apparatus 300 of FIG. 3. As depicted in FIG. 4, a router, for example, receives network traffic along multiple communication paths at 402. Generally, a "communication path," as used herein, refers to a logical structure that encapsulates a data packet of one protocol with a new header associated with the encapsulating protocol (e.g., IP tunneling (using Layer 2 Tunneling Protocol version 3 or generic routing encapsulation (GRE)) or Multiprotocol Label Switching (MPLS)). In this manner, the encapsulated data may be transmitted through networks that it would otherwise not be capable of traversing. A communication path establishes a transparent virtual network link between two network nodes that is generally unaffected by physical network links or devices (e.g., the physical network links or devices merely forward the encapsulated packet based on the new header). It should be noted that a "communication path" may also be referred to as a "communication route" or "route" and therefore, as used herein, the terms "communication path" and "communication route" and "route" may be used interchangeably.

Here, the router receives network traffic at the control plane. In general, the control plane is a part of a router architecture that is configured to, for example, control connections, disseminate connectivity information, and/or calculate optimal communication paths. The communication paths are associated with one or more control plane identifiers. A "control plane identifier," as used herein, refers to a value used in the control plane that, for example, uniquely identifies a particular virtual private network. Examples of control plane identifiers include BGP virtual private network identifiers, other BGP attributes, and route targets.

In reference to 404, the control plane identifier then is mapped to a group of forwarding identifiers. As used herein, a "forwarding identifier" refers to a value that allows intermediaries to pass a packet to a destination device interface. The forwarding identifier is used in the forwarding plane, which is a part of the router architecture that is configured to identify a destination address of an incoming packet and retrieves information used in calculating a communication path from the receiving node. Examples of forwarding identifiers include MPLS labels, virtual local area network identifiers (VLAN ID), and Media Access Control (MAC) addresses. In general, a control plane identifier maps to a group of forwarding identifiers, but it should be appreciated that the control plane identifier also may be mapped to a single forwarding identifier. As explained in more detail below, the mapping may be based on associations of control plane identifiers to forwarding plane identifiers stored in a data structure or may be based on a variety of other mapping mechanism.

Thereafter, all the forwarding identifiers associated with a particular virtual private network are identified. As depicted at 406, the identification is made by matching the group of forwarding identifiers to a forwarding identifier associated with the particular virtual private network. For example, the forwarding identifiers may be identified by comparing each forwarding identifier with the forwarding identifier associated with the particular virtual private network. The matching may result in the identification of a portion of the group of forwarding identifiers that match the forwarding identifier associated with the particular virtual private network.

At the same time, for example, a policy associated with that particular virtual private network is identified at 408 and the portion of the network traffic associated with the identified portion of the forwarding identifiers is then regulated at 410 based on the identified policy. That is, the policy defined for a particular virtual private network is applied to a portion of the network traffic associated with that virtual private network. As a result, for example, portions of the network traffic can be dynamically and uniquely regulated on a per virtual private network basis at a router without forwarding the network traffic through a dedicated switch.

In an embodiment, the network traffic may be regulated with the use of a "policer." It should be appreciated that a policer is a mechanism that regulates network traffic by dropping portions of the network traffic that exceed a threshold traffic rate. A "threshold traffic rate," as used herein, refers to a predefined value defining an upper limit of a rate of network traffic. Alternatively, rather than dropping portions of the network traffic, the policer may also remark the Differentiated Services Code Point (DSCP) field of the packet. In an alternate embodiment, a "shaper" may be used to regulate the network traffic. It should be appreciated that a shaper is a mechanism that regulates network traffic by shaping the network traffic. In traffic shaping, excess packets are stored in a queue and are scheduled for transmission at a later time. The queue may be stored in a memory that can buffer the delayed packets.

Figure 5:
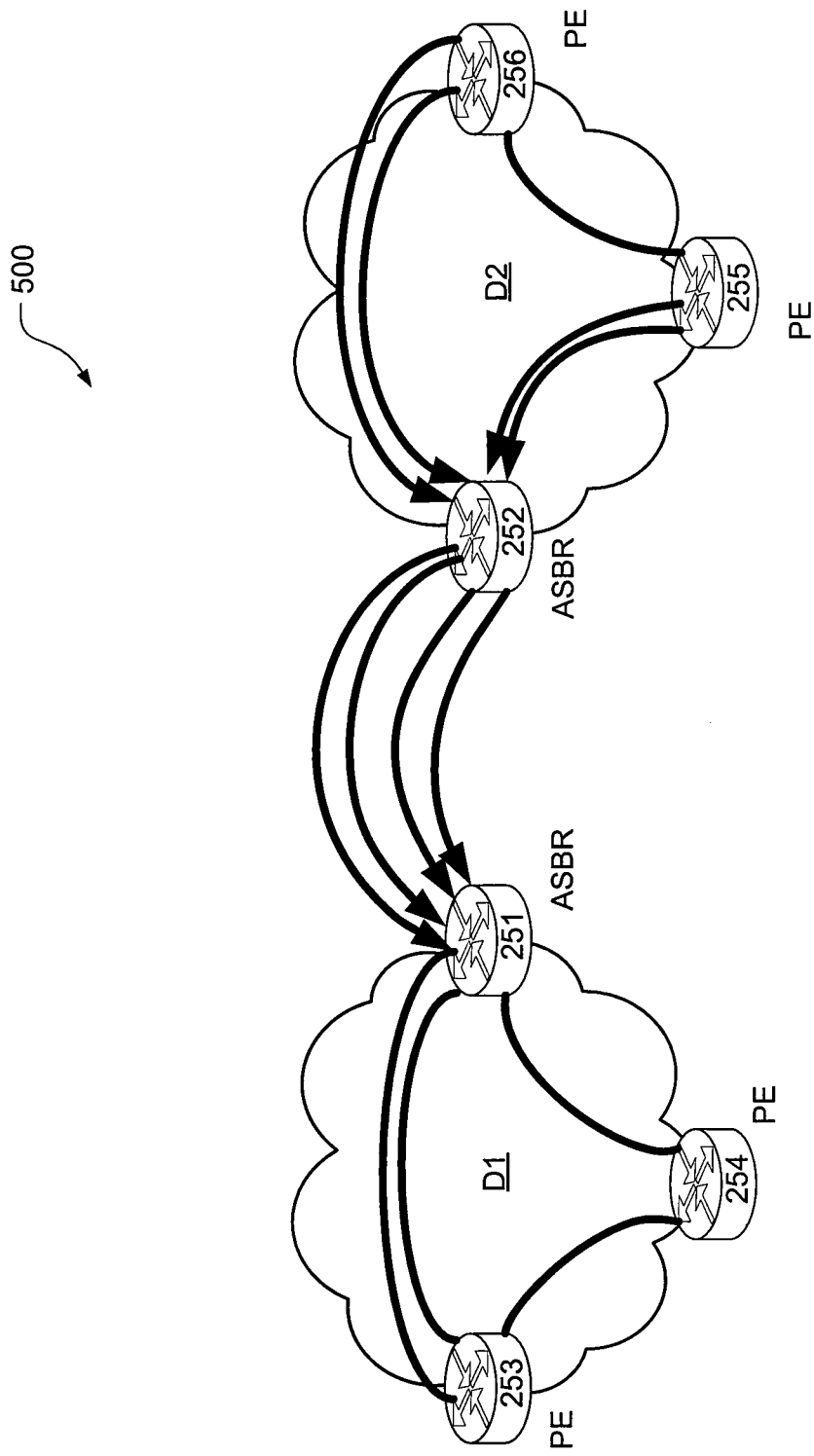
FIG. 5 depicts a diagram of the regulation of network traffic in virtual private networks consistent with various embodiments of the invention.

FIG. 5 depicts a diagram of the regulation of network traffic in virtual private networks consistent with various embodiments of the invention. Here, the computer network 500 includes multiple domains D1 and D2 interconnected by inter-domain routers 251-256. The inter-domain routers 251-256 of FIG. 5 include ASBRs 251-252 and provider edge (PE) routers 253-256, which are described above. In this example, the routing protocol used between the routers 251-256 is BGP. It should be noted that route reflectors (not shown) may be used in the computer network 500 to bypass a full mesh by enabling a BGP speaker to reflect learned routes to other peers. Such route reflectors serve as a focal point for BGP sessions and are configured to pass or reflect routes to internal neighboring nodes.

A virtual private network may be a layer 2 virtual private network (L2VPN) or a layer 3 virtual private network (L3VPN). In an embodiment, the computer network 500 depicted in FIG. 5 may include a L2VPN. In general, a L2VPN transparently carries layer 2 (or data link layer) network traffic such as Ethernet, Frame Relay, asynchronous transfer mode (ATM), High Level Data Link Control (HDLC), and Point-to-Point Protocol (PPP) over an IP/MPLS network. It should be noted that MPLS Traffic Engineering (MPLS TE) has been developed to meet data networking requirements such as guaranteed available bandwidth and fast restoration. MPLS TE uses label switching techniques to build end-to-end tunnels based on a series of constraints through an IP/MPLS network of label switch routers. It should be noted that a label is a short, fixed length, locally significant identifier used to identify a forwarding equivalence class. These tunnels may be a type of label switched communication path and thus are generally referred to as MPLS TE label switched paths. Accordingly, as used herein, it should be noted that a tunnel, a label switch path, or an MPLS TE label switched path may be referred to as a "communication path," which is described in above.

As depicted in FIG. 5, each of the routers 251-256 is connected by one or more label switched communication paths and here, the ASBRs 251-252 are capable of regulating network traffic for each virtual private network. For example, the ASBR 252 receives network traffic transmitted along communication paths connected to provider edge routers 255 and 256. A group of the communication paths is associated with a virtual private network identifier that uniquely identifies a virtual private LAN service. The virtual private network identifier refers to a value that uniquely identifies a particular virtual private network and may, for example, be included in an encapsulation header of a data packet or signaled in a message exchange. In particular, the virtual private network identifier represents a logical virtual private network entity from the perspective of a service provider.

The ASBR 252 then maps this virtual private network identifier to one or more labels (or input labels). In an embodiment, the mapping of the virtual private network identifier may be based on associations of control plane identifiers to a specific virtual private network. For example, the ASBR 252 uses the virtual private network identifier to identify a particular virtual private network, which may have one or more routes advertised in BGP. In effect, the virtual private network identifier may be used to identify routes of a particular virtual private network. With the routes identified, the ASBR 252 then extracts the labels from the routes and uses the labels in a forwarding plan.

In an alternate embodiment, the mapping may be based on associations of control plane identifiers to forwarding plane identifiers that are stored in a data structure. For example, the ASBR 252 may include a data structure in the form of a table that is configured to store a list of control plane identifiers, a list of forwarding identifiers, and associations between each control plane identifier and each forwarding identifier or group of forwarding identifiers. The ASBR 252 uses this table to look up one or more forwarding identifiers associated with a particular control plane identifier. As an example, upon receipt of a control plane identifier, the ASBR 252 accesses this table and identifies a match of the control plane identifier with one of the forwarding identifiers in the table. From this table, the ASBR 252 identifies one or more forwarding identifiers that are associated with the matched control plane identifier based on associations stored in the table.

In the example of FIG. 5, the ASBR 252 is configured to regulate network traffic associated with a particular virtual private network based on a specific QoS policy unique to that particular virtual private network. As a result, the ASBR 252 identifies a label associated with the particular virtual private network and identifies a portion of the labels from the mapping discussed above to match this label. The identification may include, for example, comparing each label from the mapping with the label associated with the particular virtual private network. The ASBR 252 then regulates a portion of the network traffic having labels that match the label associated with the particular virtual private network based on the specific QoS policy.

As discussed above, the ASBR 252 may regulate the portion of the network traffic associated with a particular virtual private network using a policing or shaping mechanism. In an embodiment, the type of regulating mechanism (policer or shaper) may be specified to the ASBR 252. That is, the type of regulating mechanism used can be driven by the configuration of the ASBR 252. For example, a service provider may set up the policer or shaper with certain criteria for particular virtual private networks, and then the labels used by these virtual private networks would be identified based on the above-described mechanisms.

In an alternate embodiment, the computer network 500 depicted in FIG. 5 may include a L3VPN. In general, L3VPN uses a network-based virtual private network model that leverages BGP to distribute virtual private network-related information. With L3VPN, each virtual private network can be uniquely identified using a set of control identifiers in the form of route targets at the ASBR 252. Alternatively, the control identifiers may be in the form of a new BGP attribute. In L3VPN, the ASBR 252 receives a communication path of interest and allocates a label. The ASBR 252 then adds this label to a group of labels that are to be regulated. The type of regulating mechanism (policer or shaper) used is defined by the configuration of the ASBR 252.

Figure 6:
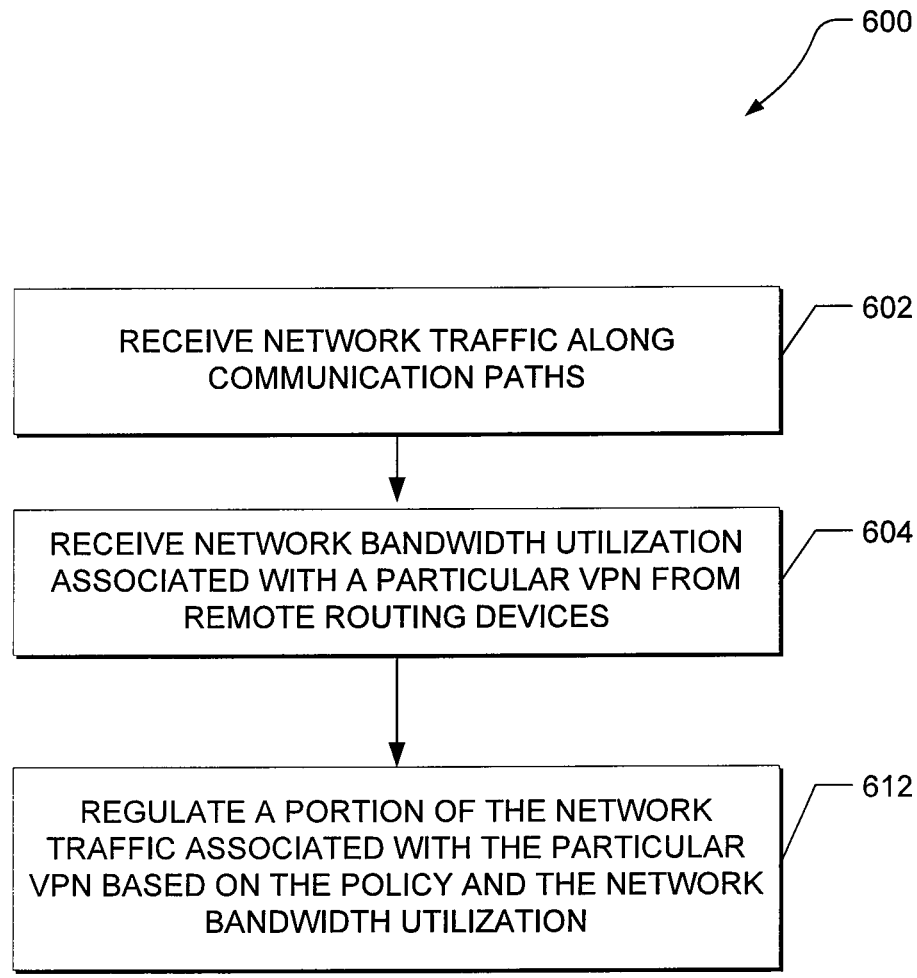
FIG. 6 depicts a flow diagram of a general overview of a method, in accordance with an embodiment, for regulating network traffic that is split among more than one output interface for each virtual private network.

FIG. 6 depicts a flow diagram of a general overview of a method 600, in accordance with an embodiment, for regulating network traffic that is split among more than one output interface for each virtual private network. In an embodiment, the method 600 may be implemented by the virtual private network traffic identification module 304 and the policy application module 308, and employed in the apparatus 300 of FIG. 3. In examples where the network traffic is split, but all the communication paths are located at the same routing device, then a provisioning plane or BGP may associate a particular set of labels to a particular communication path.

On the other hand, if the communication paths associated with a virtual private network are distributed among multiple routing devices, then each routing device regulates its network traffic based on information regarding bandwidth utilization from other remote routing devices. In particular, as depicted in FIG. 6, a routing device receives network traffic along one or more communication paths at 602. This network traffic is a portion of a total network traffic among a group of routing devices. That is, the total network traffic is divided between a group of routing devices.

At 604, the routing device also receives network bandwidth utilization associated with one or more virtual private networks from remote routing devices. A "network bandwidth utilization," as used herein, refers to information related to utilization of network bandwidth (e.g., available bandwidth and used bandwidth) associated with one or more virtual private networks. As discussed above, the routing device then maps control plane identifiers associated with the communication paths to a group of forwarding identifiers, and identifies a portion of the forwarding identifiers that match a forwarding identifier associated with a particular virtual private network.

As depicted at 612, the routing device then regulates a portion of the network traffic associated with the particular virtual private network based on a policy and also holds the network bandwidth utilization received from other remote routing devices. For example, the routing device can regulate the portion of the network traffic based on an average maintained between the different shapers located at the remote routing devices. Essentially, all the routing devices exchange network bandwidth utilization periodically between each other and each routing device regulates its network traffic, in part, based on the network bandwidth utilization. The network bandwidth utilization may be communicated using a variety of protocols, such as Inter-Control Center Communications protocol (ICCP), in accordance with an embodiment. As a result, each routing device also identifies its network bandwidth utilization associated with one or more virtual private networks and transmits this network bandwidth utilization to the other remote routing devices. These other remote routing devices may then dynamically regulate a portion of their network traffic associated with a particular virtual private network to, for example, maximize total throughput.

As an example, a total network traffic of three provider edge routers provides a total capacity of 99 MB. Each provider edge router is allocated 33 MB (99 MB/3). If one policer at one provider edge router is dropping, then the provider edge router can transmit a request in the form of a network bandwidth utilization for more bandwidth. Upon receipt of the network bandwidth utilization, the other two provider edge routers can decrease their policers by 3 MB each, such that the provider edge router that made the request can increase its policer by 6 MB to a total of 39 MB.

Figure 7:
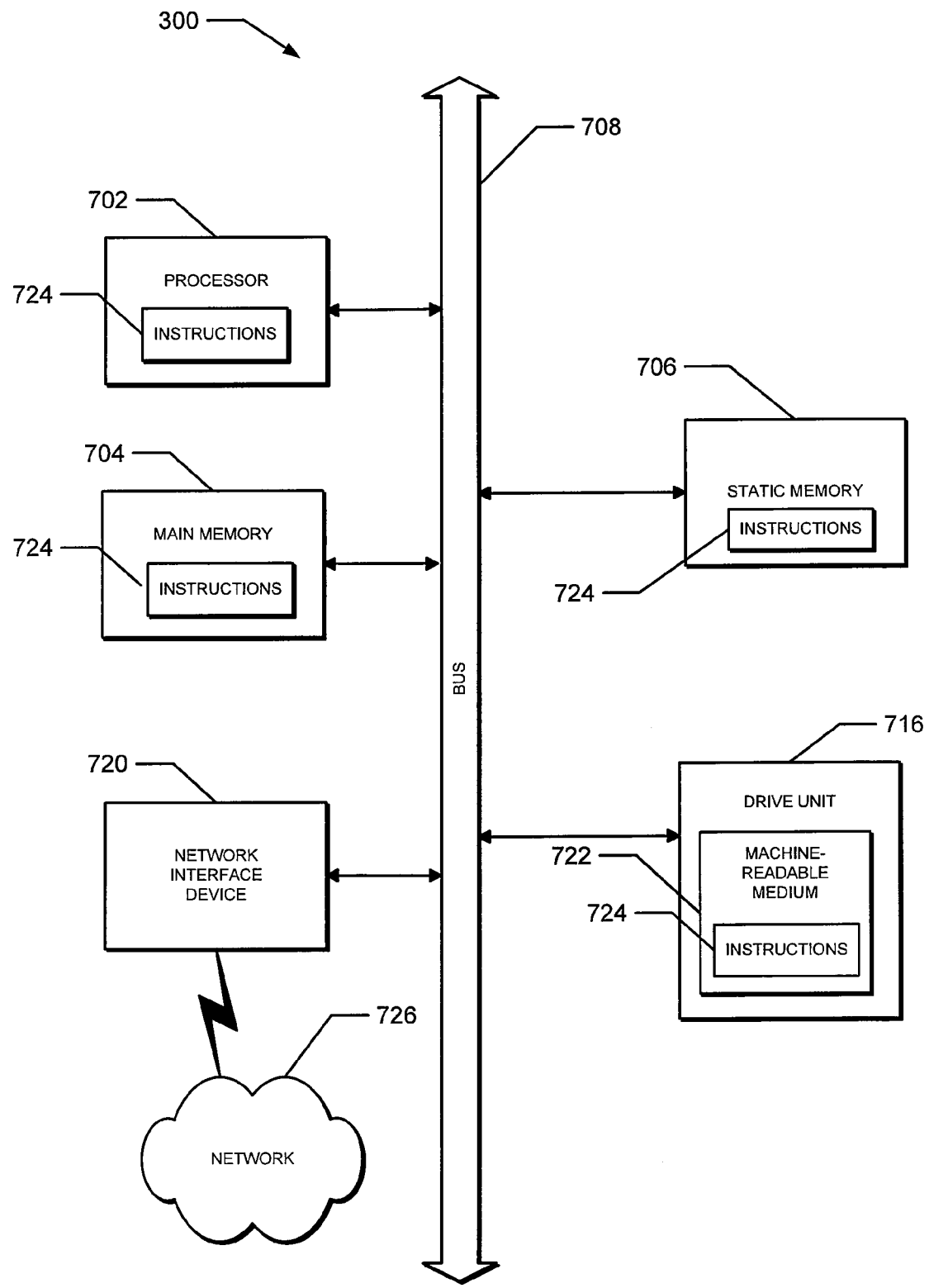
FIG. 7 is a simplified block diagram of a machine in the example form of an apparatus within which a set of instructions, for causing the machine to perform any one or more of the methodologies discussed herein, may be executed.

FIG. 7 is a simplified block diagram of a machine in the example form of an apparatus 300 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 300 includes a processor 702 (e.g., a central processing unit (CPU)), a main memory 704, and a static memory 706, which communicate with each other via bus 708. The apparatus 200 may also include a disk drive unit 716 and a network interface device 720.

The disk drive unit 716 includes machine-readable medium 722 on which is stored one or more sets of instructions and data structures 724 (e.g., software) embodying or utilized by any one or more of the methodologies or functions described herein. The instructions may also reside, completely or at least partially, within the main memory 704 and/or within the processor 702 during execution thereof by the apparatus 200, with the main memory 704 and the processor 702 also constituting machine-readable, tangible media. The instructions 724 may further be transmitted or received over network 726 via network interface device 720 utilizing any one of a number of well-known transfer protocols.

While machine-readable medium 722 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
   receiving network traffic transmitted along a plurality of communication paths, the plurality of communication paths being associated with a plurality of forwarding identifiers that identify destination addresses for the communication paths at device interfaces in a network;
   identifying a portion of the plurality of forwarding identifiers to match a forwarding identifier associated with a particular virtual private network, each forwarding identifier in the identified portion of the plurality of forwarding identifiers corresponding to a destination address in the particular virtual private network;
   identifying a policy associated with the particular virtual private network; and
   regulating a portion of the network traffic associated with the identified portion of the plurality of forwarding identifiers based on the policy, the regulation of the portion of the network traffic including shaping the portion of the network traffic by increasing a first bandwidth allocation at a first routing device of the particular virtual private network and decreasing a second bandwidth allocation at a second routing device of the particular virtual private network.

2. The method of claim 1, wherein the plurality of communication paths is further associated with a control plane identifier that corresponds to the particular virtual private network, the method further comprising mapping the control plane identifier to the plurality of forwarding identifiers through a table that maps the control plane identifier to the plurality of forwarding identifiers.

3. The method of claim 1, wherein the plurality of communication paths is a plurality of label switched communication paths, the plurality of forwarding identifiers is a plurality of input labels, and the forwarding identifier associated with the particular virtual private network is a label.

4. The method of claim 3, wherein the identification of the portion of the plurality of forwarding identifiers comprises comparing each input label in the plurality of input labels with the label associated with the particular virtual private network.

5. The method of claim 1, wherein the regulation of the portion of the network traffic comprises dropping at least the portion of the network traffic that exceeds a threshold traffic rate.

6. The method of claim 1, wherein the network traffic is a portion of a total network traffic associated with the particular virtual private network, the total network traffic is divided between a plurality of remote routing devices, the method further comprising:
   receiving a network bandwidth utilization associated with the total network traffic from at least one of the plurality of remote routing devices; and
   regulating the portion of the network traffic associated with the identified portion of the plurality of forwarding identifiers based on the policy and the network bandwidth utilization.

7. The method of claim 1, wherein regulating the portion of the network traffic associated with the identified portion of the plurality of forwarding identifiers includes comparing forwarding identifiers in the network traffic with the identified portion of the plurality of forwarding identifiers.

8. Logic encoded in one or more tangible, non-transitory media for execution and when executed operable to perform operations comprising:
   receiving network traffic transmitted along a plurality of communication paths, the plurality of communication paths being associated with a plurality of forwarding identifiers that identify destination addresses for the communication paths at device interfaces in a network;
   identifying a portion of the plurality of forwarding identifiers to match a forwarding identifier associated with a particular virtual private network, each forwarding identifier in the identified portion of the plurality of forwarding identifiers corresponding to a destination address in the particular virtual private network;
   identifying a policy associated with the particular virtual private network; and
   regulating a portion of the network traffic associated with the identified portion of the plurality of forwarding identifiers based on the policy, the regulation of the portion of the network traffic including shaping the portion of the network traffic by increasing a first bandwidth allocation at a first routing device of the particular virtual private network and decreasing a second bandwidth allocation at a second routing device of the particular virtual private network.

9. The logic of claim 8, wherein the plurality of communication paths is further associated with a control plane identifier that corresponds to the particular virtual private network, the logic further operable to map the control plane identifier to the plurality of forwarding identifiers through a table that maps the control plane identifier to the plurality of forwarding identifiers.

10. The logic of claim 9, wherein the operation of mapping the control plane identifier comprises:
   access a data structure that is configured to store a plurality of control plane identifiers, a plurality of groups of forwarding identifiers, and a plurality of associations between each of the plurality of control plane identifiers and each of the plurality of groups of forwarding identifiers;
   identify a match of the control plane identifier with one of the plurality of control plane identifiers; and
   identify one group in the plurality of groups of forwarding identifiers that is associated with the one of the plurality of control plane identifiers based on one of the plurality of associations between the one group and the one of the plurality of control plane identifiers.

11. The logic of claim 9, wherein the control plane identifier is a route target.

12. The logic of claim 8, further operable to:
   identify a network bandwidth utilization associated with the particular virtual private network; and
   transmit the network bandwidth utilization to a plurality of remote routing devices.

13. The logic of claim 12, wherein network bandwidth utilization is transmitted by way of an Inter-Control Center Communications protocol (ICCP).

14. The logic of claim 8, wherein the particular virtual private network is a Layer 2 virtual private network.

15. The logic of claim 8, wherein the particular virtual private network is a Layer 3 virtual private network.

16. The logic of claim 8, wherein the policy is a quality of service (QoS) policy.

17. An apparatus comprising:
   at least one processor; and
   a machine-readable medium in communication with the at least one processor, the machine-readable medium being configured to store a policy management and application module, the policy management and application module being executed by the at least one processor cause operations to be performed, comprising:
      receiving network traffic transmitted along a plurality of communication paths, the plurality of communication paths being associated with a plurality of forwarding identifiers that identify destination addresses for the communication paths at device interfaces in a network;
      identifying a portion of the plurality of forwarding identifiers to match a forwarding identifier associated with a particular virtual private network, each forwarding identifier in the identified portion of the plurality of forwarding identifiers corresponding to a destination address in the particular virtual private network;
      identifying a policy associated with the particular virtual private network;
      regulating a portion of the network traffic associated with the portion of the plurality of forwarding identifiers based on the policy;
      identifying a network bandwidth utilization associated with the particular virtual private network; and
      transmitting the network bandwidth utilization to a plurality of remote routing devices.

18. The apparatus of claim 17, wherein the apparatus is an autonomous system border router.

19. The apparatus of claim 17, wherein the network traffic is a portion of a total network traffic associated with the particular virtual private network, the total network traffic is divided between a plurality of remote routing devices, the operations further comprising:
   receiving a network bandwidth utilization associated with the total network traffic from at least one of the plurality of remote routing devices; and
   regulating the portion of the network traffic associated with the identified portion of the plurality of forwarding identifiers based on the policy and the network bandwidth utilization.

20. An apparatus comprising:
   a virtual private network traffic identification module configured to receive network traffic transmitted along a plurality of communication paths, the plurality of communication paths being associated with a plurality of forwarding identifiers that identify destination addresses for the communication paths at device interfaces in a network;
   a first means for identifying a portion of the plurality of forwarding identifiers to match a forwarding identifier associated with a particular virtual private network, each forwarding identifier in the identified portion of the plurality of forwarding identifiers corresponding to a destination address in the particular virtual private network;
   a second means for identifying a policy associated with the particular virtual private network; and
   a third means for regulating a portion of the network traffic associated with the portion of the plurality of forwarding identifiers based on the policy, the regulation of the portion of the network traffic including shaping the portion of the network traffic by increasing a first bandwidth allocation at a first routing device of the particular virtual private network and decreasing a second bandwidth allocation at a second routing device of the particular virtual private network.

21. A method comprising:
   receiving network traffic transmitted along a plurality of label-switched communication paths, the plurality of label-switched communication paths being associated with a plurality of input labels that identify destination addresses for the communication paths at device interfaces in a network;
   identifying a portion of the plurality of input labels to match a label associated with a particular virtual private network, each input label in the identified portion of the plurality of input labels corresponding to a destination address in the particular virtual private network;
   identifying a policy associated with the particular virtual private network; and
   regulating a portion of the network traffic associated with the identified portion of the plurality of input labels based on the policy.

22. A method comprising:
   receiving network traffic transmitted along a plurality of communication paths, the plurality of communication paths being associated with a plurality of forwarding identifiers that identify destination addresses for the communication paths at device interfaces in a network;
   identifying a portion of the plurality of forwarding identifiers to match a forwarding identifier associated with a particular virtual private network, each forwarding identifier in the identified portion of the plurality of forwarding identifiers corresponding to a destination address in the particular virtual private network;
   identifying a policy associated with the particular virtual private network;

regulating a portion of the network traffic associated with the identified portion of the plurality of forwarding identifiers based on the policy, the network traffic associated with the identified portion of the plurality of forwarding identifiers being a portion of a total network traffic associated with the particular virtual private network, and the total network traffic being divided between a plurality of remote routing devices;

receiving a network bandwidth utilization associated with the total network traffic from at least one of the plurality of remote routing devices; and regulating the portion of the network traffic associated with the identified portion of the plurality of forwarding identifiers based on the policy and the network bandwidth utilization.

23. An apparatus comprising:

at least one processor; and a machine-readable medium in communication with the at least one processor, the machine-readable medium being configured to store a policy management and application module, the policy management and application module being executed by the at least one processor cause operations to be performed, comprising:

receiving network traffic transmitted along a plurality of communication paths, the plurality of communication paths being associated with a plurality of forwarding identifiers that identify destination addresses for the communication paths at device interfaces in a network;

identifying a portion of the plurality of forwarding identifiers to match a forwarding identifier associated with a particular virtual private network, each forwarding identifier in the identified portion of the plurality of forwarding identifiers corresponding to a destination address in the particular virtual private network;

identifying a policy associated with the particular virtual private network;

regulating a portion of the network traffic associated with the portion of the plurality of forwarding identifiers based on the policy, the network traffic associated with the portion of the plurality of forwarding identifiers being a portion of a total network traffic associated with the particular virtual private network, and the total network traffic being divided between a plurality of remote routing devices;

receiving a network bandwidth utilization associated with the total network traffic from at least one of the plurality of remote routing devices; and regulating the portion of the network traffic associated with the identified portion of the plurality of forwarding identifiers based on the policy and the network bandwidth utilization.

* * * * *